(12) United States Patent
Kumar et al.

(10) Patent No.: US 8,181,258 B2
(45) Date of Patent: May 15, 2012

(54) ACCESS CONTROL LIST CONSTRUCTED AS A TREE OF MATCHING TABLES

(75) Inventors: Vinoj N. Kumar, Austin, TX (US); Narender R. Vangati, Round Rock, TX (US)

(73) Assignee: Agere Systems Inc., Allentown, PA (US)

( * ) Notice: Subject to any disclaimer, the term of this patent is extended or adjusted under 35 U.S.C. 154(b) by 1655 days.

(21) Appl. No.: 10/723,150

(22) Filed: Nov. 26, 2003

(65) Prior Publication Data

US 2005/0114657 A1    May 26, 2005

(51) Int. Cl.
*G06F 21/00* (2006.01)
(52) U.S. Cl. .......................... 726/27; 713/182
(58) Field of Classification Search .............. 713/164, 713/182; 726/27
See application file for complete search history.

(56) References Cited

U.S. PATENT DOCUMENTS

| | | | | |
|---|---|---|---|---|
| 6,651,096 B1 * | 11/2003 | Gai et al. | .................. | 709/223 |
| 7,149,216 B1 | 12/2006 | Cheriton | | |
| 2002/0085560 A1 * | 7/2002 | Cathey et al. | .................. | 370/392 |
| 2003/0005146 A1 * | 1/2003 | Miller et al. | .................. | 709/238 |
| 2003/0188198 A1 * | 10/2003 | Holdsworth et al. | ......... | 713/201 |
| 2004/0260818 A1 | 12/2004 | Valois et al. | | |
| 2005/0114655 A1 | 5/2005 | Miller et al. | | |

OTHER PUBLICATIONS

Jonwoon Lee, "Security Overview," CS530, camars.kaist.ac.kr/courses/530/2001/security.ppt, Fall 2001, pp. 1-22.
Form P10-692 from U.S. Appl. No. 10/723,160 in the name of Miller et al.

* cited by examiner

*Primary Examiner* — Christopher Brown
(74) *Attorney, Agent, or Firm* — Ryan, Mason & Lewis, LLP

(57) ABSTRACT

Techniques are disclosed for generating a representation of an access control list, the representation being utilizable in a network processor or other type of processor to perform packet filtering or other type of access control list based function. A plurality of rules of the access control list are determined, each of at least a subset of the rules having a plurality of fields and a corresponding action, and the rules are processed to generate a multi-level tree representation of the access control list, in which each of one or more of the levels of the tree representation is associated with a corresponding one of the fields. At least one level of the tree representation other than a root level of the tree representation comprises a plurality of nodes, with at least two of the nodes at that level each having a separate matching table associated therewith.

21 Claims, 3 Drawing Sheets

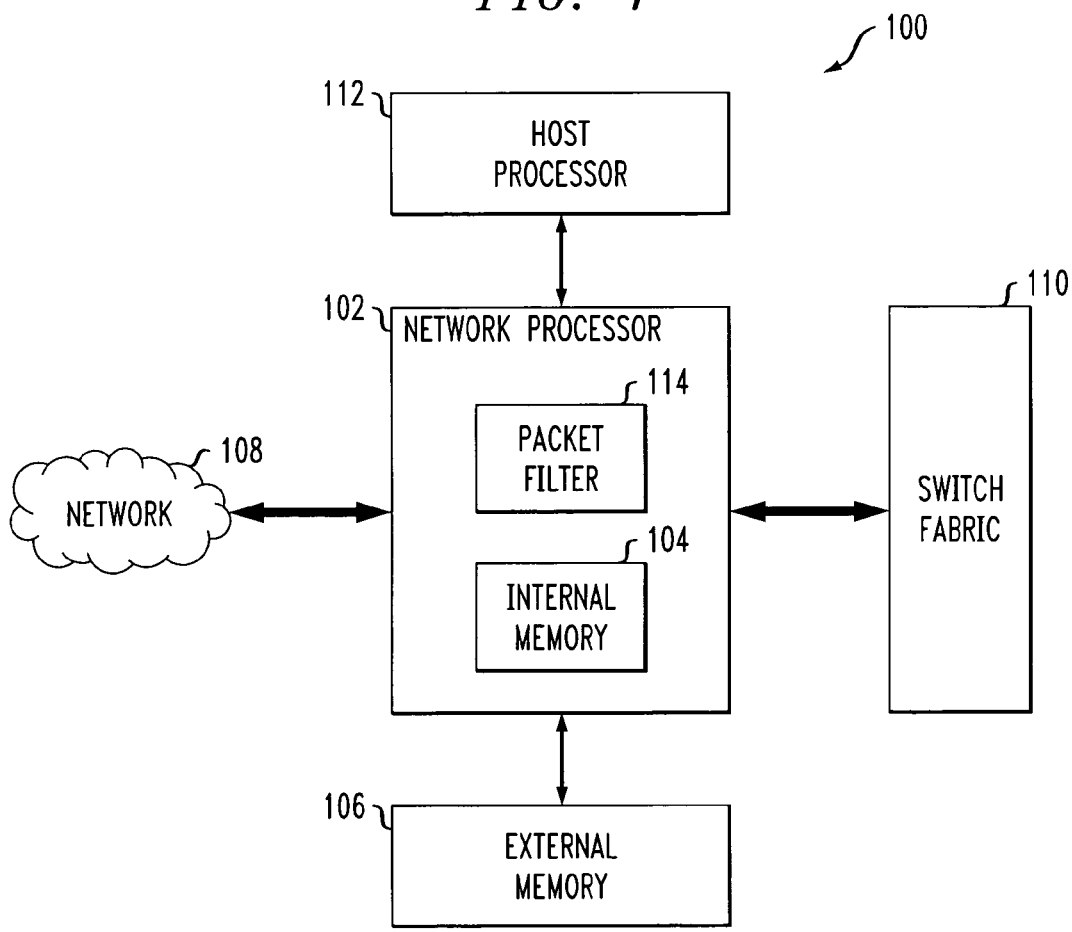

ACCESS CONTROL LIST CONSTRUCTED AS A TREE OF MATCHING TABLES

RELATED APPLICATION(S)

The present application is related to U.S. patent application Ser. No. 10/723,160, filed concurrently herewith and entitled "Directed Graph Approach For Constructing a Tree Representation of an Access Control List," which is incorporated by reference herein.

FIELD OF THE INVENTION

The present invention relates generally to network processors or other types of processors utilizable in conjunction with processing operations, such as routing or switching, performed on packets or other protocol data units (PDUs), and more particularly to access control lists (ACLs) utilized by such processors.

BACKGROUND OF THE INVENTION

Network elements such as routers or switches typically utilize ACLs to implement packet filtering or other similar functions. A given ACL generally comprises a set of rules, with each rule having one or more fields and a corresponding action. The fields of the rule define a particular pattern that may be associated with a packet, such as particular source and destination addresses in the packet filtering context, with the corresponding action specifying an action that is taken if a packet matches the particular pattern. Generally, the ACL rules are scanned for each packet arriving in a router or switch to determine if a match exists between the packet and any of the patterns. Depending on the pattern matched, the corresponding action may be either to accept or to deny the packet. ACLs typically imply an ordered matching, that is, an ordered list of the rules is utilized, and the first rule in the ordered list of rules having a pattern which matches the packet is applied to that packet.

It is desirable in many high-rate packet processing applications to configure network processors to perform ACL-based packet filtering operations. A network processor generally controls the flow of packets between a physical transmission medium and a switch fabric in a router or switch. A given router or switch may include multiple network processors arranged, by way of example, in the form of an array of line or port cards with one or more of the processors associated with each of the cards.

Although network processors are becoming increasingly powerful, they nonetheless continue to face a significant challenge in providing line rate performance for ACL-based packet filtering. This challenge is attributable in large part to deficiencies associated with conventional techniques for implementing ACLs, as will be outlined below.

One such conventional technique involves the use of ternary content addressable memories (TCAMs), which are specialized memory devices incorporating on-chip logic for performing lookups. Since TCAMs utilize hardware to achieve enhanced lookup performance, they tend to be expensive to build and also consume large amounts of power. These cost and power requirements increase substantially as the number of rules and number of fields per rule in an ACL increase. TCAMs are also not very flexible in terms of storing multiple ACLs, each of which may include different arrangements of rules and fields. As a result, TCAMs may not be practical for use in a network processor.

Another conventional technique involves storing the complete set of ACL rules in a simple set of tables or other linear format, with the rules being applied sequentially to each received packet in the manner previously described. Unfortunately, this technique is also problematic in that the processing operations associated with applying the rules to each received packet are in many cases inefficient, and can thus degrade the performance of the network processor. In addition, the amount of memory required to store the rule set can be excessive, particularly as the number of rules and number of fields per rule in an ACL increase. The excessive memory requirements are particularly problematic in the network processor context, since network processors typically have limited internal memory as well as bandwidth restrictions associated with external memory accesses.

It is therefore apparent that a need exists for improved techniques for implementing an ACL, particularly in conjunction with utilization of the ACL to provide packet filtering or related functions in a network processor.

SUMMARY OF THE INVENTION

The present invention in accordance with one aspect thereof provides techniques for generating a particularly efficient representation of an ACL. The representation is utilizable in a network processor or other type of processor to perform packet filtering or other type of ACL-based function.

The representation is generated by determining a plurality of rules of the ACL, each of at least a subset of the rules having a plurality of fields and a corresponding action, and processing the rules to generate a multi-level tree representation of the ACL, in which each of one or more of the levels of the tree representation is associated with a corresponding one of the fields. At least one level of the tree representation other than a root level of the tree representation comprises a plurality of nodes, with at least two of the nodes at that level each having a separate matching table associated therewith. The matching tables may be, by way of example, longest prefix matching (LPM) tables. A matching table at a given level of the tree representation other than a root level of the tree representation may comprise, by way of example, at least a portion of a subtree identified by a particular field value from an immediately previous level.

In an illustrative embodiment, the fields of the ACL rules comprise at least first and second fields, with the first field comprising a source address field and the second field comprising a destination address field. The root level of the tree representation in this embodiment includes a plurality of field values, each corresponding to a distinct source address in a first field of the ACL rules. The second level of the tree representation in this embodiment includes a plurality of nodes, each associated with a subtree of a given one of the distinct source addresses of the root level of the tree representation. A given one of the second level subtrees thus identifies one or more destination addresses to be examined if the corresponding root level source address matches a source address of a given received packet or other type of protocol data unit (PDU). A final level of the tree representation in this embodiment comprises a plurality of leaf nodes, each associated with one of the actions of the ACL rules.

In accordance with another aspect of the invention, the tree representation may be generated by associating a first node at the root level with a given value in a first field of one of the ACL rules, and then processing remaining field values sequentially, with each value in turn being compared to one or more existing values at the appropriate node(s) of the tree representation to determine if a match exists, and associating that value with a matching table at one of the nodes of the tree representation based at least in part on the determination. Preferably, for each of at least a subset of those nodes of the tree representation having a separate matching table associated therewith, values in the matching table are arranged in order of decreasing specificity.

The present invention in the illustrative embodiment provides significant advantages relative to conventional techniques. For example, the illustrative embodiment provides a more efficient and compact representation of an ACL, thereby improving performance in a network processor or other type of processor. Also, the invention in the illustrative embodiment facilitates updates or other maintenance operations performed on the ACL, and avoids the need for expensive specialized hardware such as TCAMs.

BRIEF DESCRIPTION OF THE DRAWINGS

FIG. 1 is a simplified block diagram of an information processing system in which the present invention is implemented.

FIG. 2 shows a set of rules associated with an example ACL utilizable in performing packet filtering or related functions in a network processor of the FIG. 1 system.

DETAILED DESCRIPTION OF THE INVENTION

Figure 3:
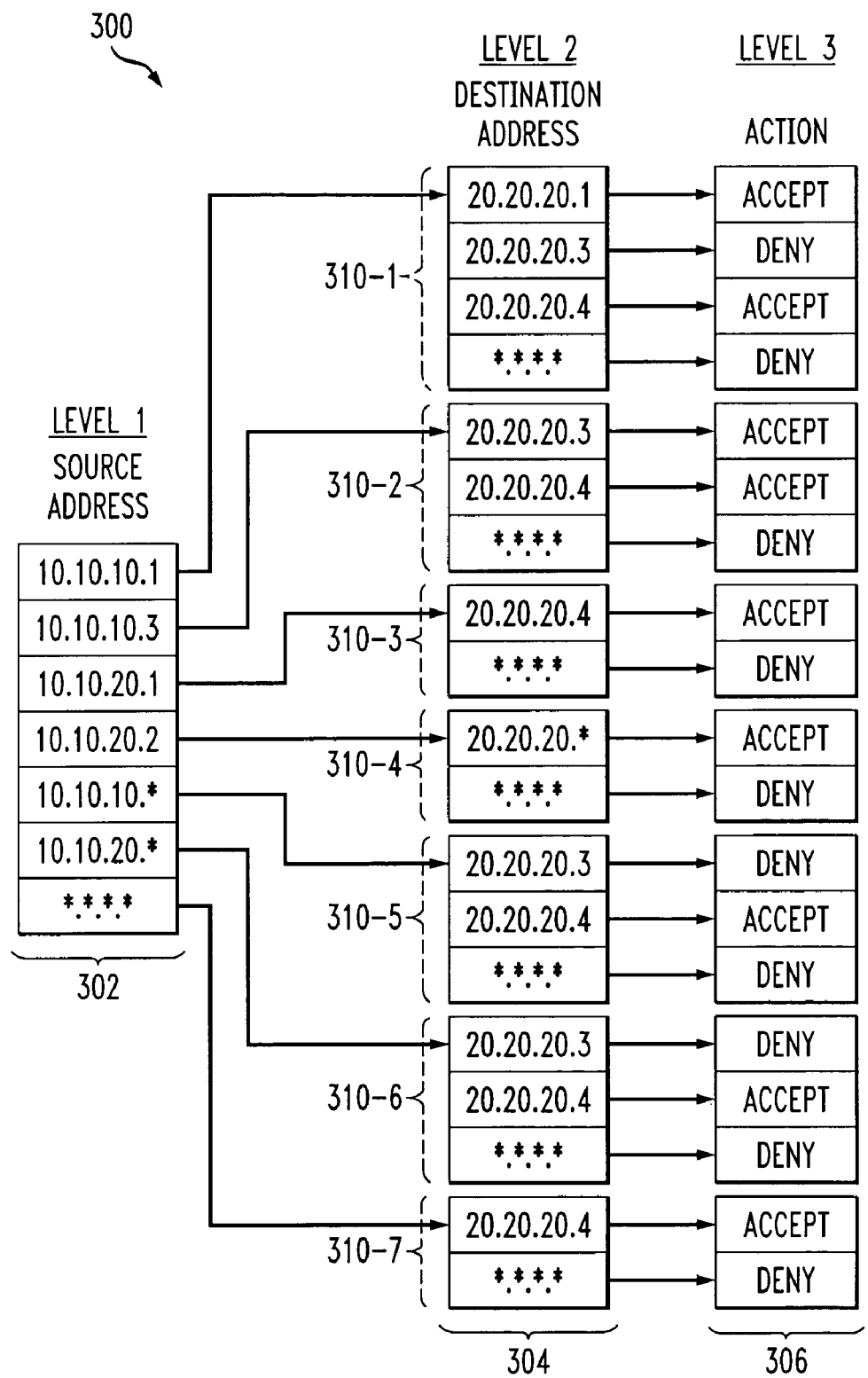
FIG. 3 shows a tree representation of the ACL in the FIG. 2 example in accordance with the invention.

The invention will be illustrated herein in conjunction with an exemplary information processing system. The system includes a network processor that utilizes an ACL configured in a particular manner. It should be understood, however, that the invention is more generally applicable to any processor in which it is desirable to provide a more efficient representation of an ACL, and thus improved performance of packet filtering or other ACL-based functions than would otherwise be possible using the conventional techniques described above.

A "processor" as the term is used herein may be implemented, by way of example and without limitation, utilizing a microprocessor, central processing unit (CPU), digital signal processor (DSP), application-specific integrated circuit (ASIC), or other type of data processing device, as well as portions or combinations of these and other devices.

The term "ACL-based processing element" as used herein is intended to include any portion of a processor or other type of logic, processing circuitry, firmware or software which is capable of implementing at least a portion of an ACL-based function, such as packet filtering. A packet filter is one possible example of an ACL-based processing element.

The term "memory circuitry" as used herein is intended to include a separate stand-alone memory as well as a particular portion of a larger memory, and may refer to internal memory, external memory or combinations thereof.

The terms "protocol data unit" and "PDU" as used herein are intended to include a packet, or other identifiable grouping of information.

FIG. 1 shows an information processing system 100 in which the invention is implemented. The system 100 includes a network processor 102 having an internal memory 104. The network processor 102 is coupled to an external memory 106 as shown, and is configured to provide an interface between a network 108 over which packets or other PDUs are carried and a switch fabric 110 which controls switching of PDU data. The processor 102 and its associated external memory 106 may be implemented, e.g., as one or more integrated circuits installed on a line card or port card of a router or switch. In such a configuration, the switch fabric 110 is generally considered to be a part of the router or switch.

One or both of the internal and external memories 104, 106 may be utilized to implement otherwise conventional network processor memory elements such as PDU buffer memory, queuing and dispatch buffer memory, etc.

Also coupled to the network processor 102 is an associated host processor 112. The host processor 112 may be configured to communicate with the network processor 102 over a standard bus architecture, e.g., a peripheral component interconnect (PCI) bus.

In accordance with an aspect of the invention, the network processor 102 includes a packet filter 114 configured to perform packet filtering operations utilizing a tree representation of an ACL. The manner in which the tree representation is generated will be described in greater detail in conjunction with FIGS. 2 and 3. Alternative embodiments may include, in addition to or in place of the packet filter 114, other types of ACL-based processing elements. Also, although identified as a packet filter, element 114 may be more generally utilized in network processor 102 to perform filtering on other types of PDUs.

It is to be appreciated that the particular arrangement of system elements shown in FIG. 1 is presented by way of illustrative example only. More particularly, as previously noted, the invention can be implemented in any type of processor, and is not limited to any particular PDU processing application. The system 100 and network processor 102 as illustrated in FIG. 1 are considerably simplified for clarity of discussion, and may include other elements in addition to or in place of those specifically shown, including one or more elements of a type commonly found in a conventional implementation of such a system and network processor. For example, the network processor may include a classifier, a traffic manager, a scheduler, queuing and dispatch logic, one or more memory controllers, interface circuitry for interfacing the network processor with the network 108, the switch fabric 110, the host processor 112 and other external devices, as well as other conventional elements not explicitly shown in the figure. These and other conventional elements, being well understood by those skilled in the art, are not described in detail herein.

The functionality of the network processor 102 as described herein may be implemented at least in part in the form of software program code. For example, the packet filter 114 or other type of ACL-based functionality may be implemented at least in part utilizing elements that are programmable via instructions or other software that may be supplied to the network processor 102 via the host processor 112 or other suitable mechanism.

In the illustrative embodiment, software in the host processor 112 is configured to generate a tree representation of an ACL, and the tree representation is subsequently downloaded from the host processor into memory circuitry associated with the network processor 102. This memory circuitry may comprise internal memory 104, external memory 106, or a combination of both internal and external memory. The tree representation is then utilized by the packet filter 114 to perform packet filtering operations. The invention is not limited with regard to the particular packet filtering or other ACL-based operations that are performed utilizing the tree representation, and such operations can be performed in an otherwise conventional manner. Also, in alternative embodiments the tree representation may be generated elsewhere in the system 100, such as in the network processor 102 itself, or using a combination of system elements, such as the host processor 112 and the network processor 102.

The present invention in the illustrative embodiment determines a set of rules of an ACL, and processes the rules to generate a multi-level tree representation of the ACL. As noted above, the rule determination and processing may be implemented in the host processor 112, in the network processor 102, in a combination of these elements, or in one or more other system elements. Generally, each of one or more of the levels of the tree representation is associated with a corresponding one of the fields of the ACL rules. In addition, at least one level of the tree representation other than a root level of the tree representation comprises a plurality of nodes, with at least two of the nodes at that level each having a separate matching table associated therewith.

The matching tables may comprise, by way of example, longest prefix matching (LPM) tables. Network processors designed for use in routing applications are typically well suited for managing, searching and otherwise processing LPM tables, and such tables are preferably used in the illustrative embodiment, although other types of matching tables can be used in other embodiments of the invention.

In an exemplary implementation to be described in conjunction with FIG. 3 below, the fields of the ACL rules include first and second fields, corresponding to respective source and destination address fields utilized in Internet Protocol (IP) packet filtering.

The above-described arrangement provides significant improvements over other arrangements which involve use of LPM tables. Such other arrangements include, for example, the use of a separate LPM table for each field, an approach referred to herein as the per-field LPM approach. The per-field LPM approach will now be described in detail, so as to provide a basis for demonstrating the advantages of the illustrative embodiment.

In the per-field LPM approach, each field of the ACL rule set is mapped to a corresponding LPM table, with matching results from each of the LPM tables being combined and utilized to access an ACL table. Thus, this approach involves creating a separate LPM table for each field in the ACL rule set. Each of the field values is assigned a distinct number and is added to the corresponding LPM table. The ACL table is constructed using the assigned numbers in a way that preserves ordered matching. When a packet arrives, each of its fields is looked up in the corresponding LPM table, and the return values, comprising assigned numbers, are concatenated together and passed to the ACL table to return the matching rule. Assuming for purposes of illustration that the fields of the ACL rules include first and second fields, corresponding to respective source and destination address fields utilized in IP packet filtering, a packet filtering operation may be characterized in the following manner:

IpACL: x=SrcAddr( ) y=DstAddr( ) ACL(x, y).

This example also assumes that a data pointer is pointing to the start of the source address in the packet. There are two LPM tables, one associated with each of the fields of the rule set. More specifically, a first LPM table, referred to as the SrcAddr table, includes assigned values for the source address field of the rule set, and a second LPM table, referred to as the DstAddr table, includes assigned values for the destination address field of the rule set. Upon arrival of a given packet, its source address and destination address are looked up in the respective SrcAddr and DstAddr tables to determine the assigned numbers. The assigned numbers, denoted by return values x and y, respectively, are then used to access the ACL table.

A disadvantage of the per-field LPM approach is the number of lookups that are required. As noted above, each field of a packet has to be looked up in a separate LPM table, with the results being combined and used to perform another lookup in the ACL table. Each of these lookups and the associated return value concatenations has a performance impact, and this impact increases significantly as the number of fields in the ACL rule set increases. As data rates increase, and the amount of time the network processor is able to spend on each packet decreases, it becomes increasingly important to make this process more efficient.

The present invention in the illustrative embodiment provides significantly improved performance relative to the per-field LPM approach. More specifically, in this embodiment, the above-described per-field LPM mapping and return value concatenation are eliminated. Instead, a multi-level tree representation is generated, in which each of one or more of the levels of the tree representation is associated with a corresponding one of the fields of the ACL rules. As noted above, the tree representation is configured such that at least one level of the tree representation other than a root level of the tree representation comprises multiple nodes each having a separate LPM table or other type of matching table associated therewith. This arrangement of LPM tables is also referred to herein as "in-line chaining" of LPM tables, since an LPM table at a given level of the tree representation is associated not with the entire field of that level but instead only with a particular field value from the previous level.

Advantageously, this improved representation of an ACL rule set provides enhanced packet filtering performance in the packet filter 114 of the network processor 102. Also, by eliminating the need for a shared number space for each field, the technique facilitates updates or other maintenance operations performed on the ACL. As a result, reduced turn-around time is provided for ACL changes, particularly in environments where ACL rules are grouped by customer, virtual local area network (VLAN), session or similar parameters.

An example algorithm for generating a tree representation for an ACL in the illustrative embodiment of the invention will now be described. In this example, source and destination address fields will again be assumed for simplicity and clarity of illustration, although it is to be appreciated that the invention is not limited to use in the IP packet filtering context.

Generally, the tree representation is constructed by processing the ACL rule set. At the root level, a first node is created for a given value in the first field of the first rule of the rule set. The remaining field values of the first rule, and the field values of the remaining rules, are then processed sequentially, with each value being compared to existing values at the appropriate node(s) of the tree. More particularly, a given value may be compared with each existing value to determine if a match exists.

When comparing, it is preferable to compare only the smallest number of bits necessary to determine if a match exists. For example, a given IP address value 10.*.*.* when compared to an existing value 20.*.*.* will not result in a match, but the given address value 10.*.*.* when compared to an existing value 10.10.*.* will result in a match since the smallest "signature" of the given address value is 10 and it matches the existing value. Similarly, a given address value 10.20.*.* when compared to an existing value 10.*.*.* will result in a match.

If there is no match, the given value is simply added to the current node and the algorithm proceeds to the corresponding subtree to process the rest of the fields of the rule.

If there is match between the given value and an existing value, there are the following three possibilities.

1. If the values are identical, then the algorithm follows the subtree for that value to apply the rest of the fields of the rule. Once this is done, the algorithm returns to process an additional rule, if any.

2. If the given value is more specific than the existing value (e.g., a given value 10.20.*.* is more specific than an existing value 10.*.*.*), then a copy of the subtree for the existing value (e.g., 10.*.*.*) is made, and the rest of the fields in the rule are applied to this subtree copy. It is possible that this subtree copy may also completely supercede the remaining fields, in which case nothing further needs to be done for the rule. But if the subtree copy is changed in any way, for example, if the remaining fields cause the subtree copy to be modified, the current field value (e.g., 10.20.*.*) is added to the corresponding node and the node is connected to the modified subtree copy. In either case, once this is done, the algorithm returns to process an additional rule, if any.

3. If the given value is less specific than the existing value (e.g., a given value 10.*.*.* is less specific than an existing value 10.20.*.*), the algorithm proceeds down the subtree. Once a point is reached where the given value is no longer less specific than an existing value, the given value is added to the corresponding node, and the algorithm proceeds to the subtree of that node to process the remaining field values of the rule.

At each node of the tree, the values are preferably organized such that the most specific values (e.g., the values having the lowest number of "don't care" bits) are at the top. This ensures that the algorithm implements its comparisons using the most specific values first, since in two of the three cases described above detection of a match avoids further processing.

A tree representation constructed in the manner described above fully represents the relationships between the rules and their field values. In such a representation, each node of one or more levels of the tree representation may be implemented as an LPM table that contains only those values that are of interest at that point in the traversal. The tree representation is thus implemented using the previously-described in-line chaining of LPM tables. This technique completely eliminates the need to maintain separate LPM tables for each field, as in the per-field LPM approach previously described. As such it also eliminates the associated lookup operations and result concatenations, thereby providing a considerable performance improvement.

An example tree representation constructed using the above algorithm will now be described with reference to FIGS. 2 and 3.

FIG. 2 shows an ACL 200 comprising a set of rules, denoted Rule 1, Rule 2, . . . Rule 9. Each rule includes two fields, namely a source address field and a destination address field, and a corresponding action, namely accept or deny. This ACL is utilizable for performing packet filtering based on IP version 4 (IPv4) source and destination addresses. In accordance with the invention, the ACL rule set is processed to generate a tree representation thereof, and the tree representation is utilized to perform packet filtering operations in the packet filter 114 of the network processor 102.

FIG. 3 shows a tree representation 300 generated by applying the previously-described algorithm to the ACL 200 of FIG. 2.

The tree representation includes three levels, denoted Level 1, Level 2 and Level 3, also indicated generally by reference numerals 302, 304 and 306, respectively. The first two levels of the tree, Level 1 and Level 2, are associated with respective source address and destination address fields of the rule set of the ACL 200. The final level of the tree, Level 3, includes leaf nodes, each associated with a particular action.

The root level of the tree, Level 1, includes a plurality of field values, each corresponding to a distinct source address in the first field of the set of nine rules of ACL 200. The root level in the illustrative embodiment may be viewed as comprising an LPM table or other type of matching table, although this is not a requirement of the invention. Similarly, the root level of the tree may be viewed as comprising only a single node having multiple values associated therewith, although again this is not a requirement.

The second level of the tree, Level 2, includes a plurality of nodes, with each of the nodes at that level having a separate LPM table associated therewith. More specifically, there are a set of seven LPM tables, denoted 310-1, 310-2, . . . 310-7, in Level 2, each representing at least a portion of a subtree of a given one of the seven distinct source address values in Level 1. The distinct source address values thus form the root level of the tree representation, and each source address value has an associated Level 2 subtree with the destination addresses to be examined if this source address matches the source address of a given packet. The term "subtree" as used herein may be viewed, in the context of the illustrative embodiment, as comprising only the corresponding Level 2 LPM table for a given node, or the LPM table and its associated Level 3 actions.

By way of example, when a source address of 10.10.10.1 is matched for the first field, it points to the LPM table 310-1 for the destination address where the values of interest are only the 20.20.20.1, 20.20.20.3, 20.20.20.4 and *.*.*.* values. Similarly, each of the other Level 2 nodes has an associated LPM table which includes only those values that are of interest given the corresponding source address match obtained at Level 1.

As indicated previously, the destination address values in the separate LPM tables 310 of Level 2 are arranged in order of decreasing specificity, that is, with the most specific values listed first in each table. Values of equal specificity level are preferably listed in numerical order, for example, in LPM table 310-1, 20.20.20.1 is listed before 20.20.20.3, 20.20.20.3 is listed before 20.20.20.4, and so on.

A tree representation such as that shown in FIG. 3 may be stored in memory circuitry associated with the network processor 102. For example, the representation may be stored in the form of information characterizing the nodes and their interconnection with other nodes, with such information including, for a given node, one or more field values associated with that node, arranged as a matching table or otherwise, as well as one or more pointers to other nodes to which the given node is connected in the tree representation. The term "tree representation" as used herein is intended to include, without limitation, such stored information characterizing the nodes and their interconnection with other nodes.

As was noted above, the in-line chaining of LPM tables in the manner shown in FIG. 3 results in a significant performance gain for packet filtering, compared to the per-field LPM approach.

In the illustrative embodiment, a packet filtering operation may be characterized in the following manner:

IpACL: ACL( ).

Again, this assumes that a data pointer is pointing to the start of the source address in the packet. It can be seen that the call and return sequence for the SrcAddr and DstAddr tables has been eliminated, as has the passing of the return values of x and y to the ACL table. The savings is even more substantial for ACLs having larger numbers of fields, such as typical ACLs having on the order of 6 to 8 fields.

As indicated previously, the invention in the illustrative embodiment also facilitates updates or other maintenance operations performed on the ACL.

A tree representation generated in accordance with the invention can be stored in an otherwise conventional memory accessible to the network processor 102, such as a static random access memory (SRAM) or a dynamic random access memory (DRAM), implemented as internal memory, external memory or a combination of both. The invention thus avoids the need for expensive specialized hardware such as TCAMs.

It should be noted that a directed graph approach to construction of a tree representation such as that shown in FIG. 3 is described in the above-cited U.S. patent application Ser. No. 10/723,160. This directed graph approach can in many cases result in a tree representation that has less redundancy, and therefore requires less memory, than a tree representation of the type shown in FIG. 3.

The system 100 can be implemented at least in part in the form of network processor integrated circuit installed in a router or switch, as will be described below in conjunction with FIG. 4. Of course, numerous other implementations are possible, and such implementations need not involve routers or switches.

Figure 4:
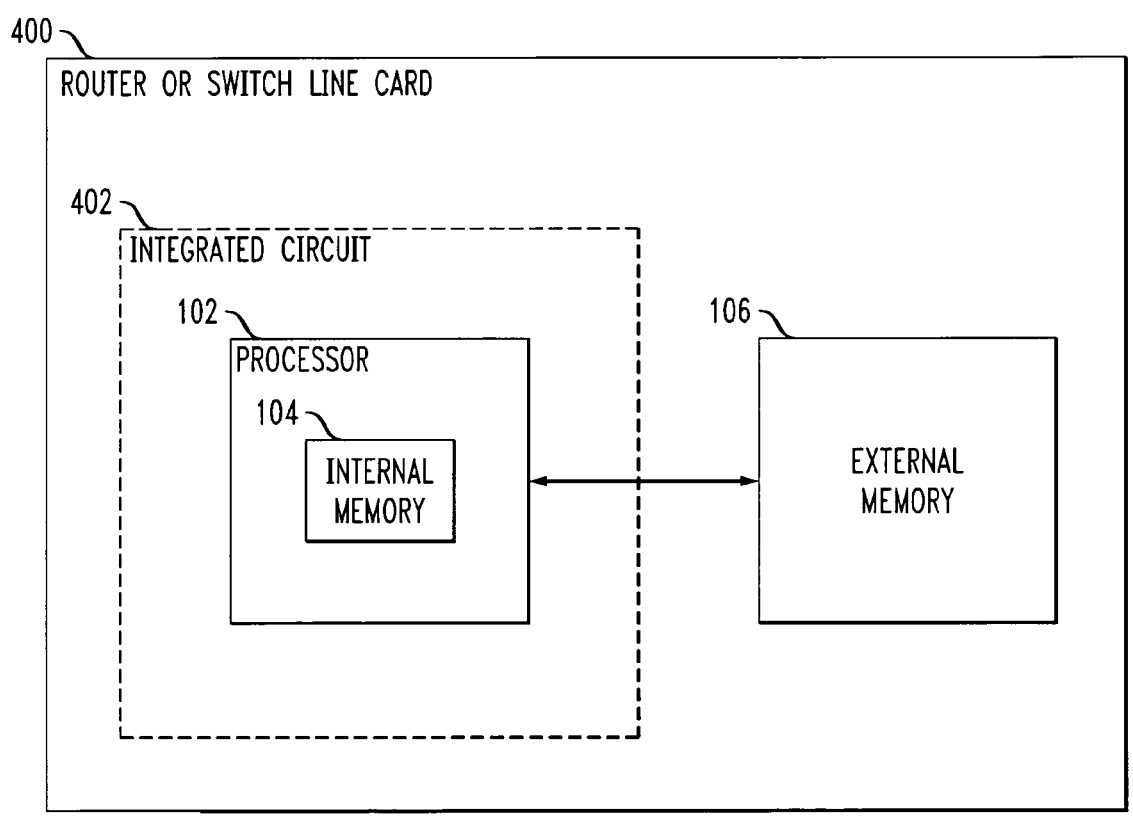
FIG. 4 illustrates one possible implementation of a network processor of the FIG. 1 system as an integrated circuit installed on a line card of a router or switch.

FIG. 4 illustrates an example router or switch line card embodiment of a portion of the system 100 of FIG. 1. In this embodiment, the processing system comprises a line card 400 having at least one integrated circuit 402 installed thereon. The integrated circuit 402 comprises network processor 102 which has internal memory 104. The network processor 102 interacts with external memory 106 on the line card 400. The above-noted host processor may also be installed on the line card 400. A tree representation of an ACL may be stored in internal memory 104, in external memory 106, or using a combination of internal and external memory.

The portion of the processing system as shown in FIG. 4 is considerably simplified for clarity of illustration. It is to be appreciated, however, that the processing system may comprise a router or switch which includes multiple such line cards, and that each of the line cards may include multiple integrated circuits. A similar embodiment may be implemented in the form of a port card in a router or switch.

It should be understood that the particular arrangements of elements shown in FIGS. 1 through 4 are by way of illustrative example only. More particularly, as previously noted, the invention can be implemented in any type of system, utilizing any type of processor, and is not limited to use with packet filtering or any other particular ACL-based function.

Also, the system 100 and network processor 102 may include other elements in addition to or in place of those specifically shown in the figures, including one or more elements of a type commonly found in a conventional implementation of such a system and network processor. These and other conventional elements, being well understood by those skilled in the art, are not described in detail herein.

The above-described embodiments of the invention are thus intended to be illustrative only. The particular ACL rules and corresponding tree representation shown in FIGS. 2 and 3, respectively, should be considered as non-limiting examples, and a wide variety of other rule sets, fields, tree representations and matching tables can be used in implementing the invention. For example, although each rule in the rule set of the illustrative embodiment of FIG. 2 includes the same number of fields, this is not a requirement of the invention, and there may be variation in the number of fields from rule to rule within a given rule set. The particular type and configurations of the matching tables, and the manner in which such tables are associated with nodes of a given level of a tree representation, may be varied in alternative embodiments of the invention. Also, the manner in which an ACL tree representation is stored, processed and otherwise utilized by a network processor or other processor can vary depending upon the particular processing application and the particular characteristics of the ACL-based processing function(s) used in that application. These and numerous other alternative embodiments within the scope of the following claims will be readily apparent to those skilled in the art.

What is claimed is:

1. A method of generating a representation of an access control list, the representation being utilizable in a processor, the method comprising the steps of:

determining a plurality of rules of the access control list, each of at least a subset of the rules having a plurality of fields and a corresponding action; and processing the rules to generate a multi-level tree representation of the access control list, each of one or more of the levels of the tree representation being associated with a corresponding one of the fields and comprising one or more nodes each associated with a respective matching table comprising one or more entries each specifying a respective value for the corresponding one of the fields;

wherein at least one level of the tree representation other than a root level of the tree representation comprises a plurality of nodes, with at least two of the nodes at that level each having a separate matching table associated therewith, each of the separate matching tables associated with that level corresponding to a respective value, for another field, specified by a corresponding one of a plurality of entries of another matching table associated with another level of the tree representation;

wherein processing the rules to generate the multi-level tree representation of the access control list comprises processing a given value in a given one of the plurality of fields of a given one of the plurality of rules to determine whether any entry of the matching table associated with a given node at the level of the tree representation associated with the given field specifies a matching value and, if no entry of the matching table associated with the given node specifies a matching value, adding to the matching table of the given node a new entry specifying the given value.

2. The method of claim 1 wherein the matching table comprises a longest prefix matching (LPM) table.

3. The method of claim 1 wherein the plurality of fields comprises at least first and second fields, the first field comprising a source address field and the second field comprising a destination address field.

4. The method of claim 1 wherein a final level of the tree representation comprises a plurality of leaf nodes, each associated with one of the actions of the plurality of rules.

5. The method of claim 1 wherein the root level of the tree representation includes a plurality of field values, each corresponding to a distinct source address in a first field of the plurality of rules.

6. The method of claim 5 wherein a second level of the tree representation includes a plurality of nodes, each being associated with a subtree of a given one of the distinct source addresses of the root level of the tree.

7. The method of claim 6 wherein a given one of the second level subtrees identifies one or more destination addresses to be examined if the corresponding root level source address matches a source address of a given received packet.

8. The method of claim 1 wherein a matching table at a given level of the tree representation other than a root level of the tree representation comprises at least a portion of a subtree identified by a particular field value from an immediately previous level.

9. The method of claim 1 wherein processing the rules to generate the multi-level tree representation of the access control list further comprises associating a first node at the root level with a given value in a first field of one of the plurality of rules, and then processing remaining field values sequentially.

10. The method of claim 1 wherein at each of at least a subset of the nodes of the tree representation having a separate matching table associated therewith, values in the matching table are arranged in order of decreasing specificity.

11. The method of claim 1 wherein the corresponding actions include at least an accept action and a deny action.

12. The method of claim 1 further including the step of storing at least a portion of the tree representation in memory circuitry accessible to the processor.

13. The method of claim 1 further including the step of utilizing the stored tree representation to perform an access control list based function in the processor.

14. The method of claim 13 wherein the access control list based function comprises packet filtering.

15. An apparatus configured for generating a representation of an access control list, the access control list comprising a plurality of rules, each of at least a subset of the rules having a plurality of fields and a corresponding action, the apparatus comprising:
    a processor having memory circuitry associated therewith;
    the memory circuitry being configured for storing at least a portion of a multi-level tree representation of the access control list, each of one or more of the levels of the tree representation being associated with a corresponding one of the fields and comprising one or more nodes each associated with a respective matching table comprising one or more entries each specifying a corresponding value for the field associated with that level;
    the processor being operative to process the rules to generate the multi-level tree representation of the access control list;
    wherein at least one level of the tree representation other than a root level of the tree representation comprises a plurality of nodes, with at least two of the nodes at that level each having a separate matching table associated therewith, each of the separate matching tables associated with that level corresponding to a respective value, for another field, specified by a corresponding one of a plurality of entries of another matching table associated with another level of the tree representation; and
    wherein processing the rules to generate the multi-level tree representation of the access control list comprises processing a given value in a given one of the plurality of fields of a given one of the plurality of rules to determine whether any entry of the matching table associated with a given node at the level of the tree representation associated with the given field specifies a matching value and, if no entry of the matching table associated with the given node specifies a matching value, adding to the matching table of the given node a new entry specifying the given value.

16. The apparatus of claim 15 wherein the access control list based function comprises packet filtering.

17. The apparatus of claim 15 wherein the memory circuitry comprises at least one of internal memory and external memory of the processor.

18. The apparatus of claim 15 wherein the processor comprises a network processor.

19. The apparatus of claim 15 wherein the processor is configured as an integrated circuit.

20. An article of manufacture comprising a non-transitory machine-readable storage medium having program code stored thereon, the program code generating a representation of an access control list, the representation being utilizable in a processor, wherein the program code when executed implements the steps of:
    determining a plurality of rules of the access control list, each of at least a subset of the rules having a plurality of fields and a corresponding action; and
    processing the rules to generate a multi-level tree representation of the access control list, each of one or more of the levels of the tree representation being associated with a corresponding one of the fields and comprising one or more nodes each associated with a respective matching table comprising one or more entries each specifying a corresponding value for the field associated with that level;
    wherein at least one level of the tree representation other than a root level of the tree representation comprises a plurality of nodes, with at least two of the nodes at that level each having a separate matching table associated therewith, each of the separate matching tables associated with that level corresponding to a respective value, for another field, specified by a corresponding one of a plurality of entries of another matching table associated with another level of the tree representation; and
    wherein processing the rules to generate the multi-level tree representation of the access control list comprises processing a given value in a given one of the plurality of fields of a given one of the plurality of rules to determine whether any entry of the matching table associated with a given node at the level of the tree representation associated with the given field specifies a matching value and, if no entry of the matching table associated with the given node specifies a matching value, adding to the matching table of the given node a new entry specifying the given value.

21. The method of claim 1 wherein generating the tree representation further comprises, responsive to a determination that an entry of the matching table associated with the given node specifies a matching value, determining whether the given value in the rule is (i) identical to the matching value, (ii) less specific than the matching value, or (iii) more specific than the matching value.

* * * * *